(12) United States Patent
Devine

(10) Patent No.: US 8,924,304 B2
(45) Date of Patent: Dec. 30, 2014

(54) METHODS FOR USING UNIQUE IDENTIFIERS TO IDENTIFY SYSTEMS IN COLLABORATIVE INTERACTION IN A MESH NETWORK

(75) Inventor: Graeme J. Devine, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 627 days.

(21) Appl. No.: 12/794,676

(22) Filed: Jun. 4, 2010

(65) Prior Publication Data
US 2011/0300943 A1 Dec. 8, 2011

(51) Int. Cl.
G06F 21/00 (2013.01)
H04L 29/06 (2006.01)
H04L 29/12 (2006.01)
H04L 12/741 (2013.01)
G06Q 30/06 (2012.01)

(52) U.S. Cl.
CPC ............ *H04L 65/4076* (2013.01); *G06F 21/00* (2013.01); *G06Q 30/06* (2013.01); *H04L 29/1232* (2013.01); *H04L 45/745* (2013.01); *H04L 61/2092* (2013.01); *H04L 65/4046* (2013.01); *H04L 67/38* (2013.01)
USPC ..................... 705/51; 705/56; 705/57; 705/58

(58) Field of Classification Search
CPC ................................ G06F 21/10; G06Q 30/06
USPC .................................................. 705/51, 56–58
See application file for complete search history.

(56) References Cited

U.S. PATENT DOCUMENTS

| | | | |
|---|---|---|---|
| 6,323,846 B1 | 11/2001 | Westerman et al. | |
| 6,570,557 B1 | 5/2003 | Westerman et al. | |
| 6,677,932 B1 | 1/2004 | Westerman | |
| 7,133,927 B2 | 11/2006 | Guo et al. | |
| 7,558,863 B1 | 7/2009 | Sitaraman et al. | |
| 7,584,248 B2 | 9/2009 | Guo et al. | |
| 7,930,346 B2* | 4/2011 | Jhaveri et al. | 709/204 |
| 8,341,207 B2 | 12/2012 | Werner et al. | |
| 8,412,833 B2 | 4/2013 | Vyrros et al. | |
| 8,438,294 B2 | 5/2013 | Lampell et al. | |
| 8,769,278 B2 | 7/2014 | Abuan et al. | |
| 2002/0015024 A1 | 2/2002 | Westerman et al. | |
| 2003/0055892 A1* | 3/2003 | Huitema et al. | 709/204 |
| 2003/0177187 A1* | 9/2003 | Levine et al. | 709/205 |
| 2003/0229779 A1* | 12/2003 | Morais et al. | 713/153 |

(Continued)

FOREIGN PATENT DOCUMENTS

WO WO-2007/047343 4/2007

OTHER PUBLICATIONS

Jeff Tyson, "How Encryption Works", Howstuffworks.com website, all pages, published May 8, 2009.*
"Hash Table," Wikipedia, (13 pgs.).

(Continued)

*Primary Examiner* — Calvin Cheung
(74) *Attorney, Agent, or Firm* — Blakely, Sokoloff, Taylor & Zafman LLP

(57) ABSTRACT

Described herein are methods and systems for using unique identifiers to identify systems in collaborative interaction in a mesh network. For example, in at least certain embodiments, upon initiation of a collaborative application each system can broadcast packets that include a unique hash identifier for each system to other systems in the mesh network. Each system then can determine when the system has received packets that include the unique hash identifiers from all systems. Then, each system can sort the unique hash identifiers to identify each system.

17 Claims, 11 Drawing Sheets

(56) References Cited

U.S. PATENT DOCUMENTS

| | | | |
|---|---|---|---|
| 2004/0064568 A1* | 4/2004 | Arora et al. ............... | 709/228 |
| 2004/0064693 A1* | 4/2004 | Pabla et al. ............... | 713/168 |
| 2004/0123104 A1* | 6/2004 | Boyen et al. .............. | 713/165 |
| 2005/0086300 A1* | 4/2005 | Yeager et al. ............. | 709/204 |
| 2005/0086329 A1* | 4/2005 | Datta et al. ............... | 709/220 |
| 2005/0135286 A1* | 6/2005 | Nurminen et al. ......... | 370/310 |
| 2006/0173781 A1* | 8/2006 | Donner ..................... | 705/50 |
| 2007/0094325 A1* | 4/2007 | Ih et al. .................... | 709/203 |
| 2007/0168512 A1* | 7/2007 | Gupta et al. ............... | 709/225 |
| 2007/0238528 A1* | 10/2007 | Harris et al. .............. | 463/42 |
| 2007/0270139 A1* | 11/2007 | Jendbro et al. ............ | 455/422.1 |
| 2007/0274233 A1* | 11/2007 | Ptashek et al. ............. | 370/254 |
| 2007/0299778 A1* | 12/2007 | Haveson et al. ........... | 705/51 |
| 2008/0005195 A1* | 1/2008 | Li ............................. | 707/203 |
| 2008/0108437 A1* | 5/2008 | Kaarela et al. ............. | 463/42 |
| 2008/0123683 A1* | 5/2008 | Cheng et al. .............. | 370/464 |
| 2008/0130639 A1* | 6/2008 | Costa-Requena et al. ... | 370/389 |
| 2008/0198850 A1 | 8/2008 | Cooper et al. | |
| 2008/0233925 A1* | 9/2008 | Sun et al. .................. | 455/414.1 |
| 2008/0261524 A1* | 10/2008 | Grushkevich .............. | 455/41.2 |
| 2009/0163272 A1* | 6/2009 | Baker et al. ................ | 463/29 |
| 2009/0275403 A1* | 11/2009 | Proctor ...................... | 463/29 |
| 2010/0115074 A1* | 5/2010 | Tapiola ...................... | 709/223 |
| 2011/0252144 A1 | 10/2011 | Tung et al. | |

OTHER PUBLICATIONS

"User Datagram Protocol," Wikipedia, (6 pgs.).

"Transmission Control Protocol," Wikipedia, (15 pgs.).

PCT International Search Report and Written Opinion of the International Searching Authority, PCT/US2011/038620 filed May 31, 2011, mailed Aug. 16, 2011.

Daal, K., "Link.m—punchball—Open-source iPhone arcade game revision r3", Google Project Hosting, Dec. 3, 2009, pp. 1-5, XP000002655627, retrieved from the Internet: URL:http://code.google.com/p/punchball/source/browse/trunk/Classes/Link.m. [retrieved on Aug. 3, 2011.

Apple Inc.: "TankViewController.m", iOS developer Library, Jun. 8, 2009, XP000002655628, retrieved from the Internet: URL:http://developer.apple.com/LIBRARY/IOS/samplecode/GKTank/GKTank.zip [retrieved on Aug. 3, 2011].

Apple Inc.: "Game Kit Framework Reference", May 26, 2009, XP000002655629, retrieved from the Internet: URL:http://pooh.poly.asu.edu/Cst194/Resources/Docs/system.framework.GameKit_Collection.pdf [retrieved on Aug. 3, 2011].

Knutsson B et al.: "Peer-to-peer support for massively multiplayer games", INFOCOM 2004. Twenty-Third Annual Joint Conference of the IEEE Computer and Communications Societies, IEEE, Piscataway, NJ, USA, vol. 1, Mar. 7, 2004, pp. 96-107, XP010740794, DOI: 10.11090/INFCOM.2004.1354485, ISBN: 978-0-7803-8355-5.

Jiang et al.: "An approach to achieve scalability through a structured peer-to-peer network for massively multiplayer online role playing games", Computer Communications, Elsevier Science Publishers BV, Amsterdam, NL, vol. 30, No. 16, Oct. 13, 2007, pp. 3075-3084, XP022297346, ISSN: 0140-3664, DOI: 10.1016/J.comcom,2007.05.052, p. 3076, right-hand column.

"Game Kit Programming Guide", Apple Inc., May 28, 2009, 24 pages.

"iPhone User Guide for iPhone OS 3.0 Software", Apple Inc., release date of Jun. 24, 2009, 213 pages.

PCT International Preliminary Reptort on Patentability for PCT/US2011/038620, mailed Dec. 13, 2012.

\* cited by examiner

METHODS FOR USING UNIQUE IDENTIFIERS TO IDENTIFY SYSTEMS IN COLLABORATIVE INTERACTION IN A MESH NETWORK

TECHNICAL FIELD

Embodiments of the present invention relate to methods for using unique identifiers to identify systems in collaborative interaction in a mesh network.

BACKGROUND

Various devices such as electronic devices, computing systems, portable devices, and handheld devices have collaborative applications such as software gaming applications. These devices can network with each other for a multi-player gaming experience.

One prior gaming environment allows players to interact with each other online. A server communicates over a data network with a number of client computers. The server receives information from the client computers to update the state of the multi-player game and distributes information back to the client computers regarding relevant game state for each of the client computers.

However, this prior approach has limitations in terms of connecting players and network delays. These online connections use the transmission control protocol (TCP) that provides reliable, ordered delivery of a stream of bytes from a game application on the client computer to the server and vice versa. The TCP controls segment size, flow control, the rate at which data is exchanged, and network traffic congestion. However, TCP packets may have timing, readiness, and internet issues that cause some client computers to not have relevant game information in a timely manner or at all.

SUMMARY

Described herein are methods for using unique identifiers to identify systems in collaborative interaction in, for example, a mesh network. For example, in at least certain embodiments, at least one system initiates a collaborative application (e.g., music creation, document creation, multi-player games) with other systems. In response, a data service provides a collaborative environment that matches systems and provides connection data to the systems to generate a mesh network. In one embodiment, each system in the mesh network or other network can perform a hash function on a unique identifier associated with each system to generate a unique hash identifier for each system. Then, each system can broadcast packets that include the unique hash identifier for each system and also status information to other systems in the mesh network. Each system can then determine when the system has heard from all systems and when the other systems have also heard from all other systems. Then, in one embodiment, each system can sort the unique hash identifiers to assign a relative reference value to each system in the mesh network and thus identify each system with the sorted unique hash identifier. In one embodiment, each system identifies other systems with these assigned relative reference values, which can be used for determining, for example, a player order in a multi-player gaming application or can be used for assigning each system to be a server or client in the mesh network.

In an embodiment, the unique identifier for each is obtained from memory of the system. Each system performs a hash function on the unique identifier for the system in a non-reversible manner to generate a unique hash identifier for the system and to protect the unique identifier. The unique identifier can be universally unique relative to all other systems of relatively unique within a type or subset of systems of a particular type of hardware, or a particular combination of hardware and software, etc.

The present disclosure includes systems and devices that perform these methods, including data processing systems which perform these methods, and machine readable media which when executed on data processing systems cause the systems to perform these methods.

BRIEF DESCRIPTION OF THE DRAWINGS

The present invention is illustrated by way of example, and not by way of limitation, in the figures of the accompanying drawings and in which.

DETAILED DESCRIPTION

Described herein are methods for using unique identifiers to identify systems in collaborative interaction in a mesh network. For example, in at least certain embodiments, at least one system initiates a collaborative application (e.g., music creation, document creation, multi-player games). In response, a data service provides a collaborative environment that matches systems and provides connection data to the systems to generate a mesh network. Each system generates a hash identifier based on a unique identifier associated with the system. The hash identifiers are exchanged between systems within the mesh network. The hash identifiers can be sorted to identify systems in the mesh network.

Figure 1:
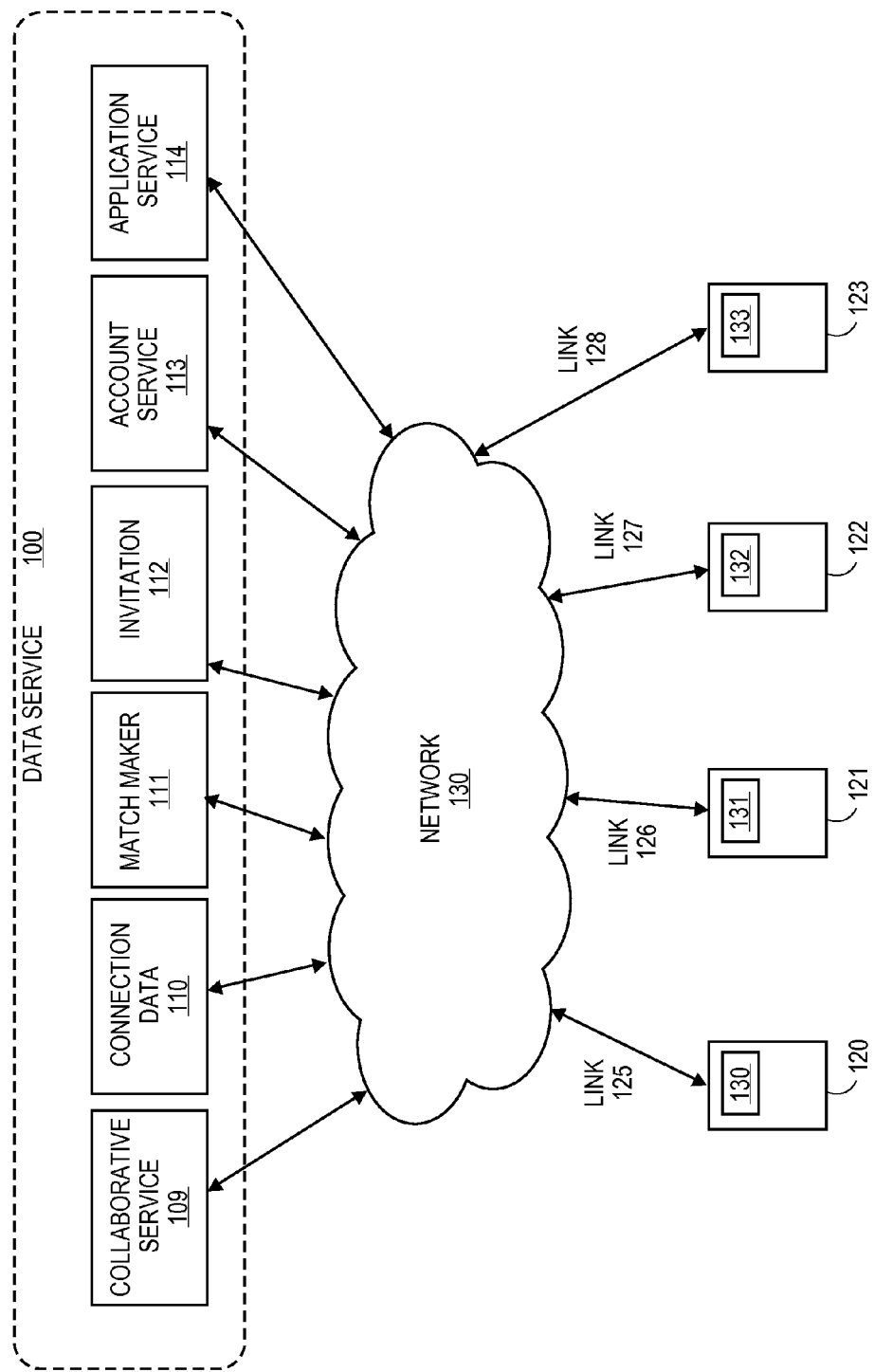
FIG. 1 illustrates a general network topology implemented in one embodiment that can include a group of "client" or "peer" computing systems 120-123, respectively, communicating with one another and with one or more services 109-114 over a network 130.

As illustrated in FIG. 1, a general network topology implemented in one embodiment can include a group of "client" or "peer" computing systems 120-123, respectively, communicating with one another and with one or more services 109-114 over a network 130. Although illustrated as a single network cloud in FIG. 1, the "network" 130 can be comprised of a variety of different components including public networks such as the Internet and private networks such as local Wi-Fi networks (e.g., 902.11n home wireless networks or wireless hotspots), local area Ethernet networks, cellular data networks, and WiMAX networks, to name a few. For example, system 120 may be connected to a home Wi-Fi network represented by network link 125, system 121 may be connected to a 3G network (e.g., Universal Mobile Telecommunications System ("UMTS"), High-Speed Uplink Packet Access ("HSUPA"), etc) represented by network link 126, system 122 may be connected to a WiMAX network represented by network link 127, and system 123 may be connected to a public Wi-Fi network represented by network link 128. Each of the local network links 125-128 over which the systems 120-123 are connected may be coupled to a public network such as the Internet, thereby enabling communication between the various systems 120-123 over the public network. However, if two systems are on the same local or private network (e.g., the same Wi-Fi network), then the two systems may communicate directly over that local/private network, bypassing the public network. It should be noted, of course, that the underlying principles of the present disclosure are not limited to any particular set of network types or network topologies and that the term mesh network is meant to include one or more networks of the same or different types.

Each of the systems 120-123 illustrated in FIG. 1 can communicate with a data service 100 that may include a collaborative service 109 (e.g., game service, music creation service, document creation service), a connection data exchange (CDX) service 110, a matchmaker service 111, an invitation service 112, an account service 113, and an application service 114. In one embodiment, the collaborative service 109 enables user to collaborate with collaborative applications. For example, the collaborative service 109 may be a game service that enables users to collaborate for multi-player gaming applications or other multiple user applications. The game service may include or access any of the services 110-114. The services 109-114 can be implemented as software executed across one or more physical computing systems such as servers. As shown in FIG. 1, in one embodiment, the services may be implemented within the context of a larger data service 100 managed by the same entity (e.g., the same company) and accessible by each of the systems 120-123 over the network 130. The data service 100 can include a local area network (e.g., an Ethernet-based LAN) connecting various types of servers, a storage area networks ("SANs") and databases. In one embodiment, the databases store and manage data related to each of the user systems (e.g., client systems, computer systems, mobile systems) 120-123 and the users of those systems (e.g., user account data, system account data, user application data, etc.).

In one embodiment, a collaborative identifier module 130-133 is located on each system 120-123, respectively. The collaborative identifier module is associated with a collaborative software application that provides a collaborative environment in conjunction with the data service 100.

In one embodiment, the collaborative identifier module 130-133 is implemented on a game framework such as that described in co-pending applications U.S. patent application No. 61/321,854, entitled "APPLICATION PROGRAMMING INTERFACE, SYSTEM AND METHOD FOR COLLABORATIVE ONLINE APPLICATIONS," Filed Apr. 7, 2010 by Mike Lampell; U.S. patent application No. 61/321,842, entitled "APPARATUS AND METHOD FOR MATCHING USERS FOR ONLINE SESSIONS", Filed Apr. 7, 2010 by Jeremy Werner, Phillip Smith, Andrew H. Vyrros; U.S. patent application No. 61/321,832, entitled "APPARATUS AND METHOD FOR INVITING USERS TO ONLINE SESSIONS", Filed Apr. 7, 2010 by Andrew H. Vyrros, Jeremy Werner, and Patrick Gates; U.S. patent application No. 61/321,841, entitled "APPARATUS AND METHOD FOR ESTABLISHING AND UTILIZING BACKUP COMMUNICATION CHANNELS", Filed Apr. 7, 2010 by Jeff Tung, Barry A. Whitebook, Joe Abuan, Hyeonkuk Jeong, Andy Yang, and Roberto Garcia; and U.S. patent application No. 61/321,851, entitled "APPARATUS AND METHOD FOR EFFICIENTLY AND SECURELY EXCHANGING CONNECTION DATA", Filed Apr. 7, 2010 by Joe Abuan, Jeff Tung, Robert Quattlebaum, Barry A. Whitebook, and Roberto Garcia (hereinafter "Co-pending Applications"), which are assigned to the assignee of the present application and which are incorporated herein by reference in their entirety. It should be noted, however, that the game framework described in the co-pending applications is not required for complying with the underlying principles of the invention.

The matchmaker service 111 can match two or more systems for a collaborative peer to peer (P2P) session based on a specified set of conditions. For example, users of two or more of the systems may be interested in playing a particular multi-player game. In such a case, the matchmaker service 111 may identify a group of systems to participate in the game based on variables such as each user's level of expertise, the age of each of the users, the timing of the match requests, the particular game for which a match is requested and game-specific variables associated with the game. By way of example, and not limitation, the matchmaker service 111 may attempt to match users with similar levels of expertise at playing a particular game. Additionally, adults may be matched with other adults and children may be matched with other children. Moreover, the matchmaker service 111 may prioritize user requests based on the order in which those requests are received. The underlying principles of the present disclosure are not limited to any particular set of matching criteria or any particular type of P2P application.

In response to a match request, the matchmaker service 111 can coordinate with the CDX service 110 to ensure that all matched participants receive the necessary connection data for establishing P2P sessions in an efficient and secure manner.

In one embodiment, the invitation service 112 also identifies systems for participation in collaborative P2P sessions. However, in the case of the invitation service 112, at least one of the participants is specifically identified by another participant. For example, the user of system 120 may specifically request a collaborative session with the user of system 121. As with the matchmaker service 111, in response to an invitation request, the invitation service 112 can identify the set of participants and coordinate with the CDX service 110 to ensure that all participants receive the necessary connection data for establishing P2P sessions in an efficient and secure manner.

Figure 2:
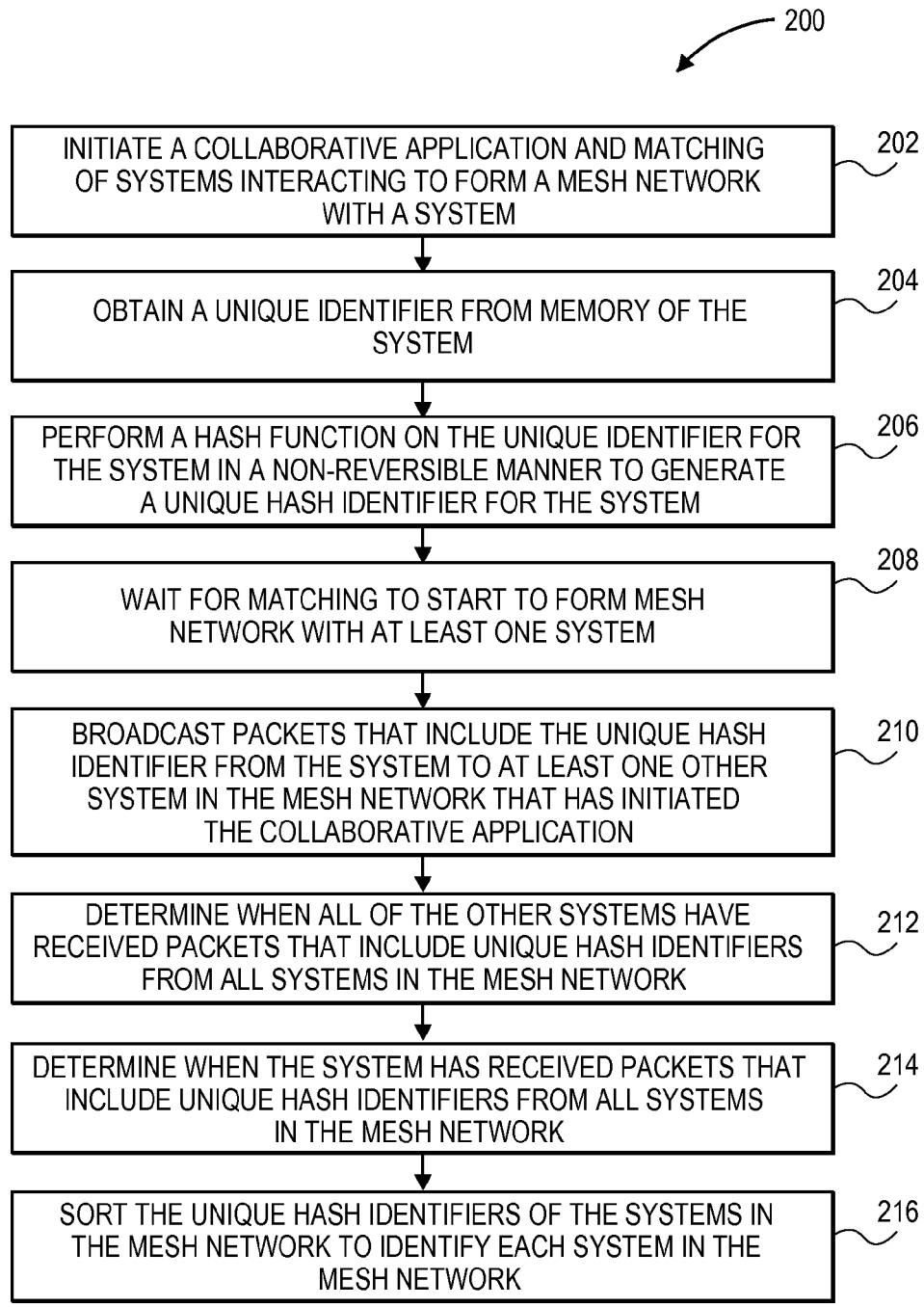
FIG. 2 illustrates a flow diagram of one embodiment for a computer-implemented method 200 of using unique identifiers to identify systems in collaborative interaction in a mesh network.

FIG. 2 illustrates a flow diagram of one embodiment for a computer-implemented method 200 of using unique identifiers to identify systems in collaborative interaction in a mesh network. The unique identifiers can be universally unique or merely unique within a set of devices, such as devices having the same set of software or hardware (or a combination of the same software and hardware). Mesh networking is a type of networking in which each node in the network may act as an independent router, regardless of whether it is connected to another network or not. The computer-implemented method 200 is performed by processing logic that may comprise hardware (circuitry, dedicated logic, etc.), software (such as is run on a general purpose computer system or a dedicated machine or a system), or a combination of both.

At block 202, the processing logic can initiate a collaborative application (e.g., music creation, document creation, multi-player games) and matching of systems interacting collaboratively to form a mesh network. The matchmaker service 111 can match two or more systems for a collaborative session (e.g., peer to peer (P2P)). At block 204, the processing logic of a system can obtain a unique identifier from memory of the system. At block 206, the processing logic can perform a hash function on the unique identifier for the system in a non-reversible manner to generate a unique hash identifier for the system.

The unique hash identifier is generated in a non-reversible manner to protect the unique identifier of the system and prevent a spoofing attack. Even though the unique hash identifier is provided to other devices in a collaborative session, the unique identifier remains a secret (relative to those other devices) because the hash function used is non-reversible (e.g., the hash function cannot be reversed to reveal the unique identifier if the unique hash identifier is known). At block 208, the processing logic can wait for the matching to start to form a mesh network with at least one system. As discussed above, the matchmaking service 111 can match two or more systems for a collaborative session (e.g., music creation session, document creation session, multi-player gaming session).

At block 210, the processing logic can broadcast packets that include the unique hash identifier from the system to at least one other system in the mesh network or other network that has initiated the collaborative application. In one embodiment, each packet also contains heard from status information (e.g., cointoss data). The status information includes a field that indicates how many systems including the first system in the mesh network that the first system has heard from, a heard from status field for the first system, a heard from status field for the second system, a heard from status field for the third system, etc.

In an embodiment, the packets are sent and received using an unreliable connectionless protocol (e.g., user datagram protocol (UDP)). UDP is a simple to implement protocol because it does not require tracking of every packet sent or received and it does not need to initiate or end a transmission. An establishment of a series of unique network identifiers to be shared amongst systems is guaranteed by using the unreliable protocol because the reliable protocol (TCP) is not guaranteed in a mobile environment and TCP queuing is undesirable when establishing this mesh. One of the unique aspects of this unreliable protocol is that by necessity it works well over unreliable networks that can actually be unreliable with only a certain percentage of packets actually arriving.

At block 212, the processing logic can determine when all of the other systems have received packets that include unique hash identifiers from all systems in the mesh network. At block 214, the processing logic can determine when the system has received packets that include unique hash identifiers from all systems in the mesh network. At block 216, the processing logic for each system or the data service 100 can sort the unique hash identifiers in order to identify each system in the mesh network. The unique hash identifiers may be assigned relative reference values to identify each system. In certain embodiments, the reference value for each system can be used to order players in a gaming application, assign preferences (e.g., colors) to each user or player sharing the collaborative application, or assign systems to be either a server or a client in the mesh network.

Figure 3:
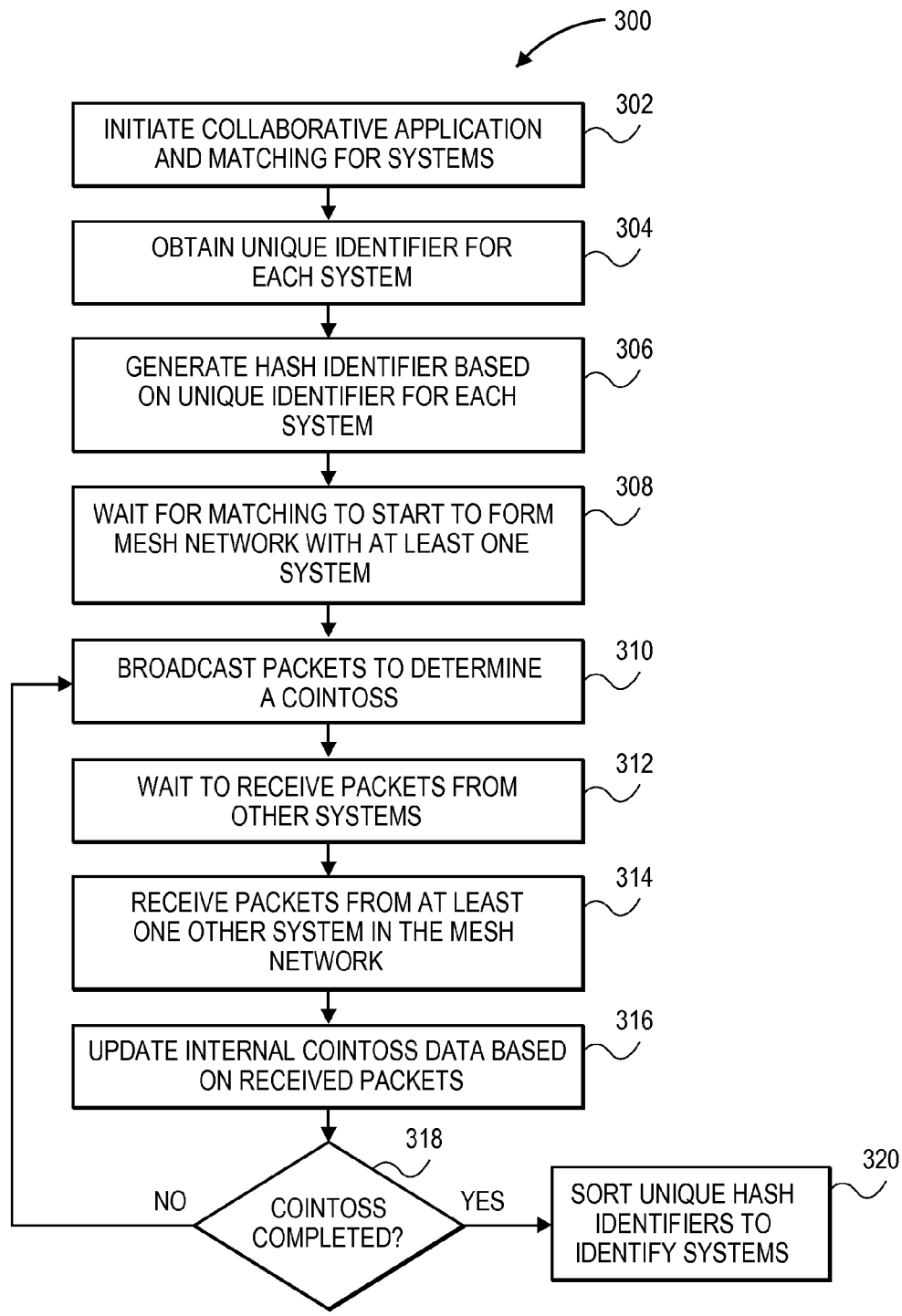
FIG. 3 illustrates a flow diagram of one embodiment for a computer-implemented method 300 of using unique identifiers to identify systems in collaborative interaction in a mesh network.

FIG. 3 illustrates a flow diagram of one embodiment for a computer-implemented method 300 of using unique identifiers to identify systems in collaborative interaction in a mesh network. The computer-implemented method 300 is performed by processing logic that may comprise hardware (circuitry, dedicated logic, etc.), software (such as is run on a general purpose computer system or a dedicated machine or a system), or a combination of both.

At block 302, the processing logic of a system may receive a user selection to initiate a collaborative application (e.g., multi-player gaming application) and matching of systems interacting collaboratively. The matchmaker service 111 can match two or more systems for a collaborative session (e.g., peer to peer (P2P)) based on a specified set of conditions. For example, users of two or more of the systems may be interested in playing a particular multi-player game. In such a case, the matchmaker service 111 may identify a group of systems to participate in the game based on variables such as each user's level of expertise, the age of each of the users, the timing of the match requests, the particular game for which a match is requested and game-specific variables associated with the game. In response to a match request, the matchmaker service 111 can coordinate with the CDX service 110 to ensure that all matched participants receive the necessary connection data (e.g., network addresses) for establishing P2P sessions in an efficient and secure manner to form a mesh network of systems that interact collaboratively.

At block 304, the processing logic for each system can obtain a unique identifier that uniquely identifies each system. The unique identifier may be obtained from memory of the system. At block 306, the processing logic for each system may perform a hash function on the unique identifier for each system to generate a unique hash identifier for each system. At block 308, the processing logic can wait for the matching to start to form a mesh network with at least one system. As discussed above, the matchmaking service 111 can match two or more systems for a collaborative peer to peer (P2P) session (e.g., multi-player gaming session). For example, the matchmaking service may match four players having similar skill levels to play a multi-player gaming application.

Figure 5:
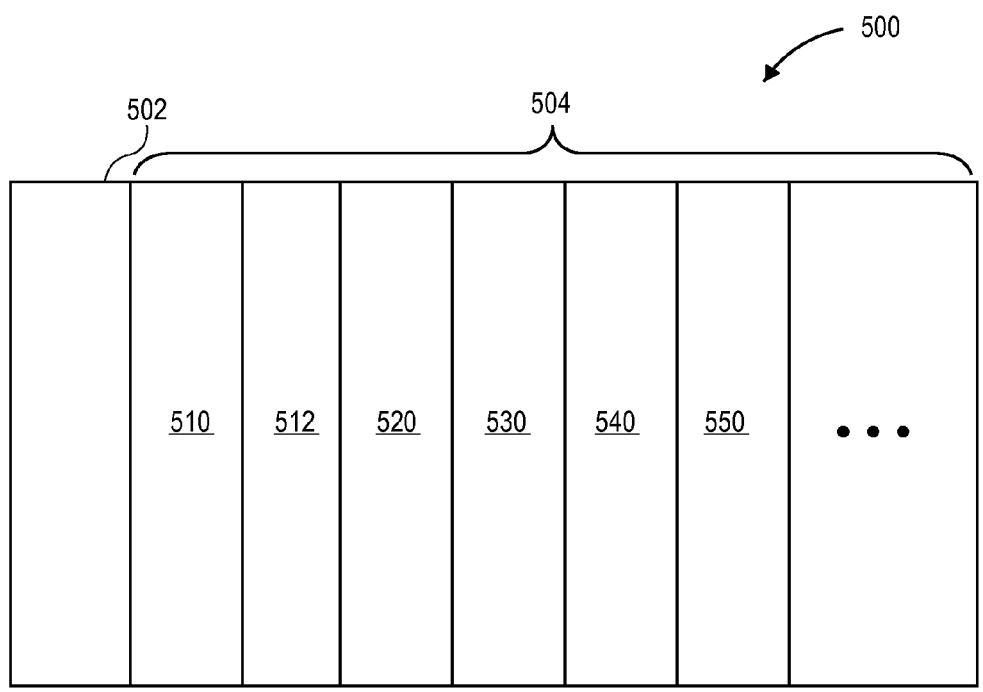
FIG. 5 illustrates an exemplary packet broadcast by a system in accordance with one embodiment.

At block 310, each system broadcasts packets to determine a cointoss for the multi-player gaming application. For example, the cointoss may determine player ordering or colors for each player. For a particular system, the packets include the unique hash identifier for the particular system. Each packet also contains heard from status information (e.g., cointoss data) as illustrated in FIG. 5 and described in more detail below in conjunction with FIG. 5. In an embodiment, the packet for a first system includes a unique hash identifier for the first system, a field that indicates how many systems including the first system in the mesh network that the first system has heard from, a heard from status field for the first system, a heard from status field for the second system, a heard from status field for the third system, etc.

The processing logic for each system can wait to receive packets broadcasted from other systems in the mesh network at block 312. Each system may continue to broadcast packets at block 310. At block 314, one or more systems can receive packets (e.g, cointoss packets) from other systems in the mesh network or other network. For example, the first system broadcasts packets to the other systems. These packets indicate that the first system is ready for the collaborative application (e.g., multi-player application). The other systems broadcast packets and these packets indicate to the first system that these systems are ready and also that these other systems know that the first system is ready. In one embodiment, the packets are sent and received using an unreliable connectionless protocol (e.g., UDP).

At block 316, the processing logic for each system that receives packets from other systems can update internal cointoss data for the particular system. At block 318, the processing logic for each system can determine whether the cointoss is complete. The flow diagram of FIG. 4 describes this operation in more detail. In an embodiment, the first system determines whether the cointoss is complete by checking the heard from status information (e.g., cointoss data). This data may indicate that the first system has heard from all systems in the mesh network or other network and additionally that each system has individually heard from all systems (and received the unique hash identifier from all systems) in the mesh network or other network. In this case, the cointoss is complete for the first system. If all systems determine that the cointoss is complete, then the unique hash identifiers can be sorted at block 320, in each of all of the systems, in order to assign a relative reference value to each system in the mesh network or other network. If the cointoss is not complete for a particular system at block 318, then the system broadcasts packets at block 310.

Each system may sort the unique hash identifiers using the same or similar sorting routine or method (e.g., numerical, alphabetic, alphanumerical, etc.) and thus generate the same result. The resulting relative reference values may indicate a player order, player colors, etc. for the multi-player gaming application. The relative reference values may also be used to configure the systems in the mesh network or other network. For example, one system may be elected as a server and the other systems are elected as clients. Alternatively, the systems may form P2P connections.

Figure 4:
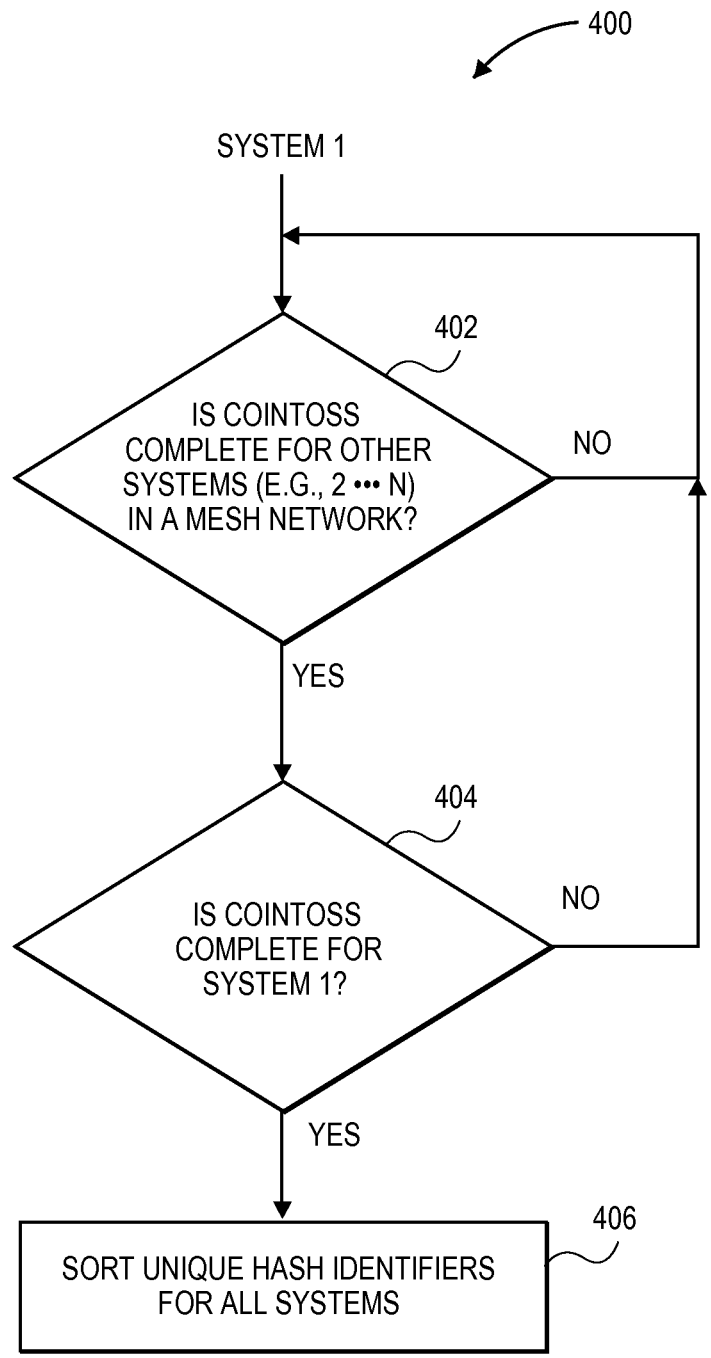
FIG. 4 illustrates a flow diagram of one embodiment for a computer-implemented method 400 of determining a status of a cointoss.

FIG. 4 illustrates a flow diagram of one embodiment for a computer-implemented method 400 of determining a status of a cointoss. The computer-implemented method 400 is performed by processing logic that may comprise hardware (circuitry, dedicated logic, etc.), software (such as is run on a general purpose computer system or a dedicated machine or a system), or a combination of both. Processing logic of each system in a mesh network or other network may perform the method 400.

Figure 8:
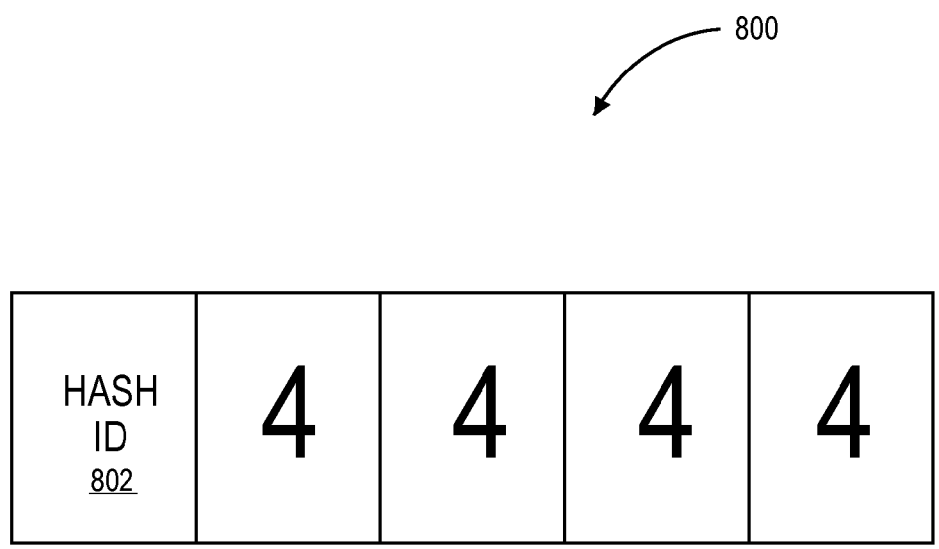
FIG. 8 illustrates an exemplary bit string have an expected final status in accordance with one embodiment.

At block 402, the processing logic for each system can determine a heard from status for the other systems to determine if the other systems have heard from all other systems in the mesh network or other network. The other systems may be checked at block 402. For example, in one embodiment, a first system checks a heard from status for a second system. If the second system has an expected final status (e.g., 4444 for 4 systems), then the second system has heard from all other systems and the cointoss is complete for the second system. The flow returns to block 402 if the second system has not heard from all other systems. If the second system has heard from all other systems, then the processing logic determines whether the other systems (e.g., third and fourth systems) have also heard from all other systems at block 402. If so, then the processing logic for the first system determines whether the first system has heard from all other systems in the mesh network at block 404 and has the expected final status (e.g., 4444 for 4 systems) as illustrated as bit string 800 in FIG. 8 in accordance with one embodiment. The bit string 800 includes the hash identifier 802 for the system and the number of systems that each system has heard from. If the other systems do not have the expected final status, then the flow returns to block 402 to determine if the other systems (e.g., third system, fourth system) have heard from all other systems and have the expected final status (e.g., 4444 for 4 systems). This flow of operations continues until all systems have heard from all other systems and have received the unique hash identifier from each of the other systems. Once this occurs and each system has heard back from all other systems, then the cointoss is complete for all systems. At block 406, sorting of the unique hash identifiers can occur as described at block 320 of method 300.

If the first system has not heard back from all other systems at block 404, then the flow returns to block 402. In an embodiment, packets are sent and received between systems across an unreliable network using an unreliable connectionless protocol (e.g., user datagram protocol (UDP)). One of the unique aspects of this unreliable protocol is that by necessity it works well over unreliable networks that can actually be unreliable with only a certain percentage of packets actually arriving.

FIG. 5 illustrates an exemplary packet broadcast by a system in accordance with one embodiment. The packet may be associated with an unreliable connectionless protocol (e.g., user datagram protocol (UDP)). Each packet 500 may contain a header portion 502 and a data portion 504. The header portion may include source information (e.g., source port), destination information (e.g., destination port), length information, and checksum information. In an embodiment, the data portion 504 includes an identification field 510 having a unique hash identifier (e.g., 64 bit identifier) for the first system, a field 512 that indicates how many systems the first system has heard from (e.g., 1 if the first system has only heard from the first system), and a heard from status field 520 of the first system that indicates heard from status of the first system (e.g., 1344 for four systems in a mesh network with 1 representing the number of systems heard by the first system, 3 representing the number of systems heard by the second system, 4 representing the number of systems heard by the third system, and 4 representing the number of systems heard by the fourth system). The data portion 504 also includes a heard from status field 530 for the second system that indicates how many systems including the second system that the second system has heard from, a heard from status field 540 for the third system, a heard from status field 550 for the fourth system, etc.

Figure 6:
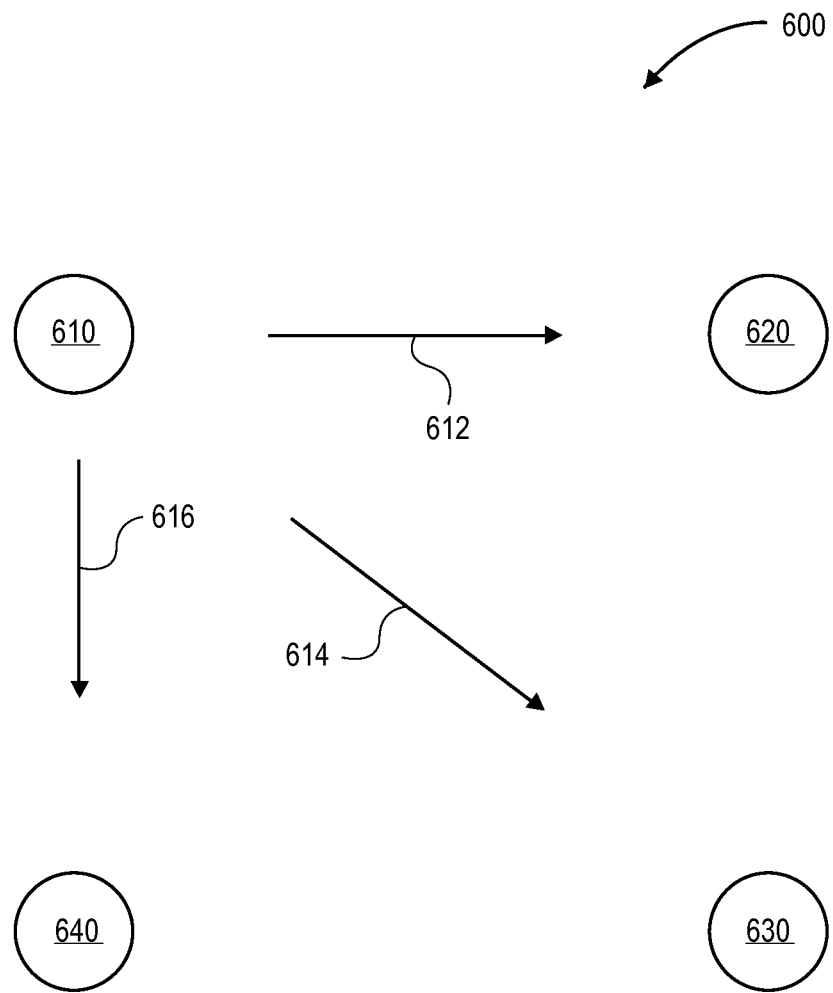
FIG. 6 illustrates a mesh network 600 having four systems in communication with each other in accordance with one embodiment.

FIG. 6 illustrates a mesh network 600 having four systems in communication with each other in accordance with one embodiment. It will be understood that an embodiment of the invention can use a mesh network to connect at least some of the devices in a collaborative session and that other embodiments of the invention can use a non-mesh network to connect all of the devices in a collaborative session. One or more of the systems 610, 620, 630, and 640 initiates a collaborative application. The systems are matched together as discussed at block 302 of FIG. 3. Once the systems have been matched and the connections formed between systems that now have network addresses for each other then the systems can broadcast packets to each other as discussed at block 310. For simplicity only the packets 612, 614, and 616 from system 610 have been shown in FIG. 6. In a similar manner, the other systems broadcast packets as well in order to determine the cointoss and assign reference values to each system. The packets include various fields as discussed in conjunction with FIG. 5. A packet may have an expected final status (e.g., 4444 for 4 systems) as illustrated as bit string 800 in FIG. 8. The bit string 800 includes the hash identifier 802 for the system and the number of systems that each system has heard from. In an embodiment, the users associated with systems 610, 620, 620, and 640 may want to play a four person gaming application. Each user may need to know which system is player 1, player 2, player 3, and player 4. This information is necessary for assigning colors, positions, and having the same guaranteed result on each system. Also, if one player wants to add random elements to the game or an artificial intelligence of some sort, then a player needs to be elected to manage these additions or changes and tell others about it. The cointoss can be used to determine player ordering. The players exchange a token that is unique (e.g., hash identifiers) and wait for responses. Networking issues may cause one or more players to be missing a vital bit of information. Thus, each system needs to hear from all of the other systems and each system needs to know that the other systems have also heard from all systems.

As discussed above, in an embodiment, the packets are sent and received using an unreliable connectionless protocol (e.g., user datagram protocol (UDP)). An establishment of a series of unique network identifiers to be shared amongst systems is guaranteed by using the unreliable protocol because the reliable protocol (TCP) is not guaranteed in a mobile environment and TCP queuing is undesirable when establishing this mesh. One of the unique aspects of this unreliable protocol is that by necessity it works well over unreliable networks that can actually be unreliable with only a certain percentage of packets actually arriving.

In one embodiment, system 610 has a heard from status field of 1344, system 620 has a heard from status field of 3144, system 630 has a heard from status field of 4134, and system 640 has a heard from status field of 4314. These status fields would indicate that all systems having the same data in regards to each other. If system 610 hears from system 620, then the status field for system 610 updates to 2344.

Alternatively, system 610 may have a different status field for system 620 than system 620 actually has because the status field of system 620 has been recently updated and system 610 is not aware of this update.

Mesh networking allows for continuous connections and reconfiguration around broken or blocked paths by "hopping" from node to node until the destination is reached. Mesh networks are self-healing: the network can still operate when one node breaks down or a connection goes bad. As a result, the network may typically be very reliable, as there is often more than one path between a source and a destination in the network. A mesh network can be a local area network (LAN) that employs one of two connection arrangements, full mesh topology or partial mesh topology. In the full mesh topology, each (system or other device) is connected directly to each of the others. In the partial mesh topology, some nodes are connected to all the others, but some of the nodes are connected only to those other nodes with which they exchange the most data.

Figure 7:
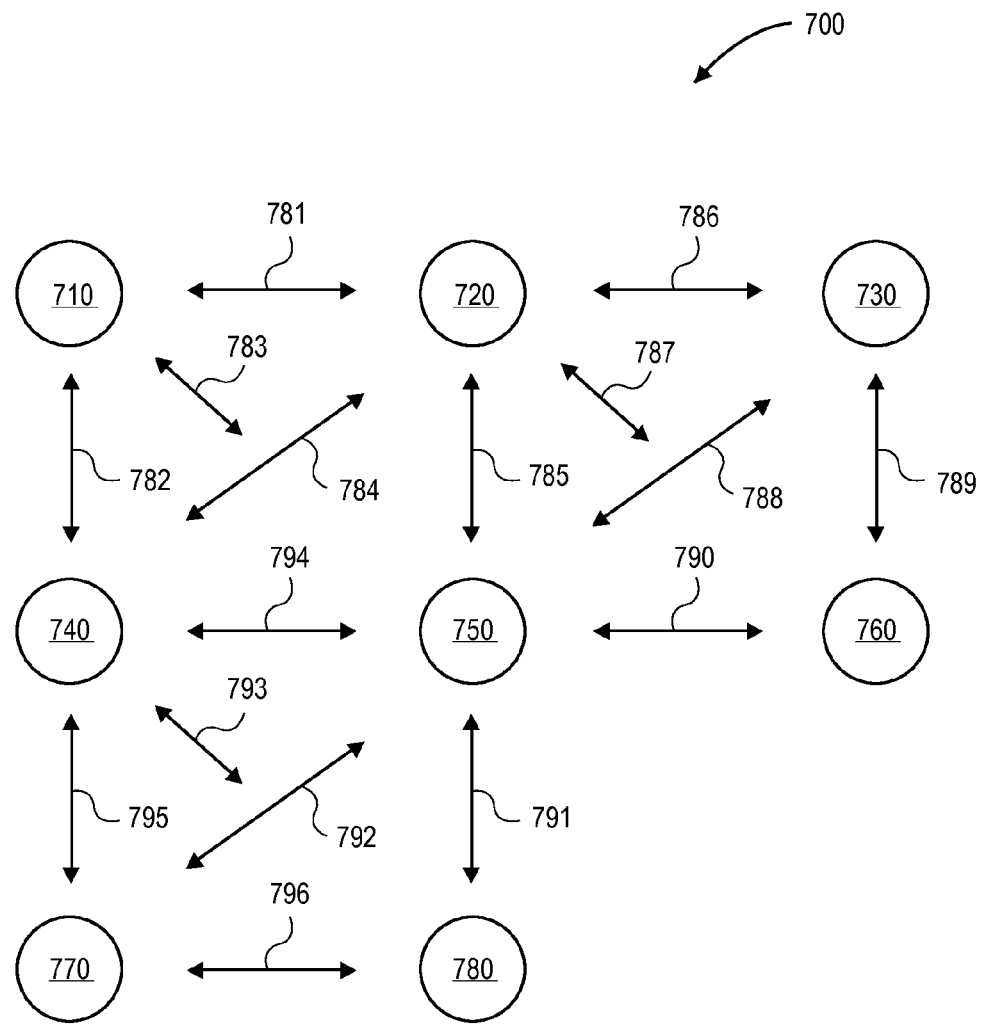
FIG. 7 illustrates a mesh network 700 having eight systems in communication with each other in accordance with one embodiment.

FIG. 7 illustrates a mesh network 700 having eight systems in communication with each other in accordance with one embodiment. The systems 710, 720, 730, 740, 750, 760, 770, and 780 initiate a collaborative application and are matched together as discussed at block 302 of FIG. 3. Once the systems have been matched and the connections formed between systems then the systems can broadcast packets to each other as discussed at block 310. Exemplary bidirectional communication links 781-796 used in part for broadcasting packets are illustrated in FIG. 7. The packets with the cointoss data are used to determine the cointoss and assign reference values to each system. In certain embodiments, the collaborative application is a multi-player gaming application and the assigned reference values determine player ordering. The reference values can also be used to configure the systems in the mesh network. One system can be elected a server and the other systems can be elected a client. For example, system 750 may be elected a server. Packets sent from system 770 to system 730 may be routed through system 750. If system 750 quits the collaborative application (e.g., multi-player gaming application), then another system can be elected to be the server. In an embodiment, after a collaborative application begins then additional players can not be added. A star or ring network of nodes can also be formed using the reference values.

In an alternative embodiment, the network 700 is a node based network that implements the cointoss to obtain cointoss data from other systems and to identify systems in the network 700. For example, system 740 can be a node that communicates with system 710, system 770, system 720, system 750, and system 780. System 750 can be a node that communicates with system 730, system 760, and system 780. If either of system 740 or 750 drops from the node network, then the node network automatically reforms using the cointoss data.

Figure 9:
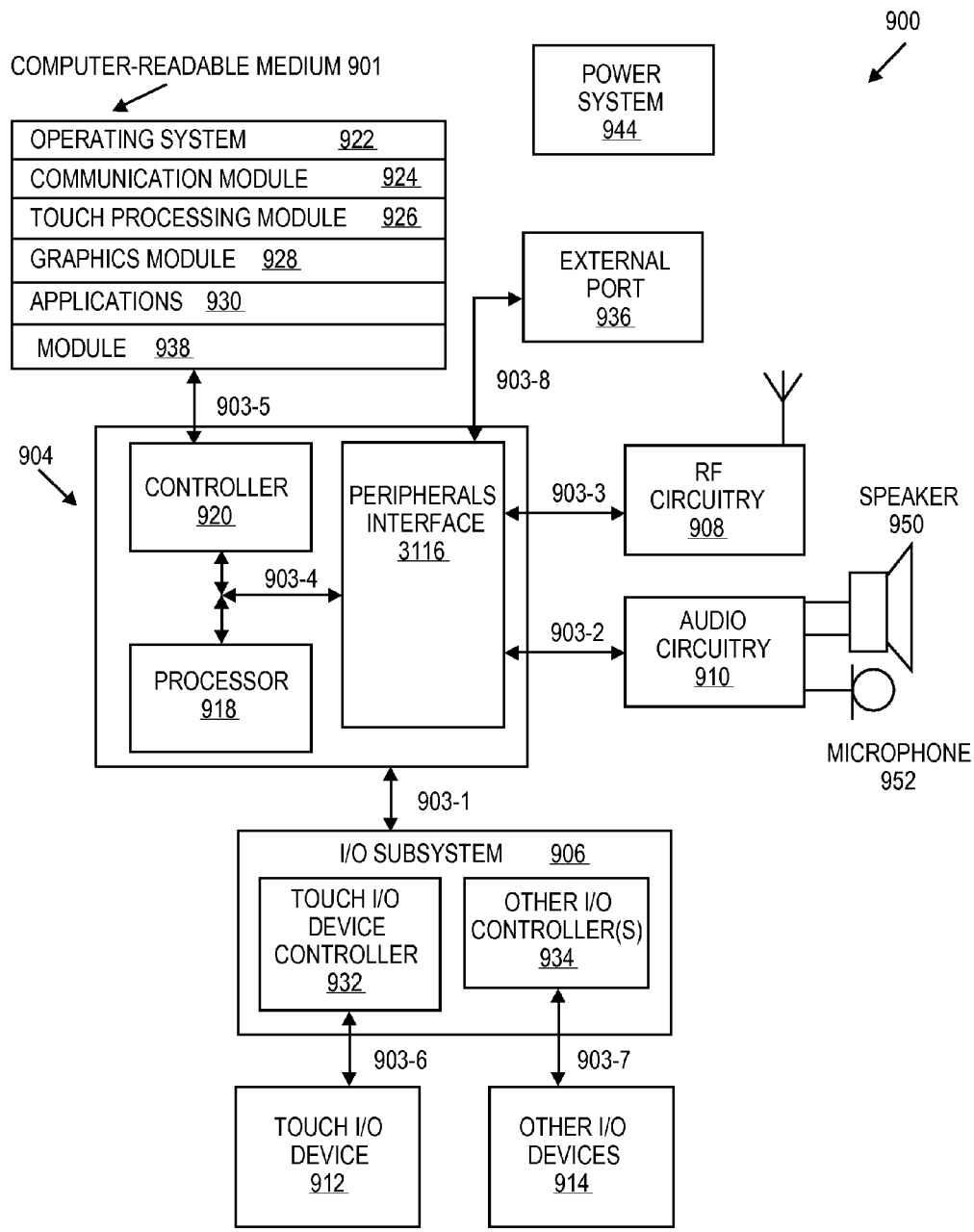
FIG. 9 shows an embodiment of a wireless system which includes the capability for wireless communication.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 900, including combinations of two or more of these types of devices. FIG. 9 is a block diagram of one embodiment of system 900 that generally includes one or more computer-readable non-transitory storage mediums 901, processing system 904, Input/Output (I/O) subsystem 906, radio frequency (RF) circuitry 908 and audio circuitry 910. These components may be coupled by one or more communication buses or signal lines 903.

It should be apparent that the architecture shown in FIG. 9 is only one example architecture of system 900, and that system 900 could have more or fewer components than shown, or a different configuration of components. The various components shown in FIG. 9 can be implemented in hardware, software, firmware or any combination thereof, including one or more signal processing and/or application specific integrated circuits.

RF circuitry 908 is used to send and receive information over a wireless link or network to one or more other devices and includes well-known circuitry for performing this function. RF circuitry 908 and audio circuitry 910 are coupled to processing system 904 via peripherals interface 916. Interface 916 includes various known components for establishing and maintaining communication between peripherals and processing system 904. Audio circuitry 910 is coupled to audio speaker 950 and microphone 952 and includes known circuitry for processing voice signals received from interface 916 to enable a user to communicate in real-time with other users. In some embodiments, audio circuitry 910 includes a headphone jack (not shown).

Peripherals interface 916 couples the input and output peripherals of the system to processor 918 and computer-readable medium 901. One or more processors 918 communicate with one or more computer-readable mediums 901 via controller 920. Computer-readable medium 901 can be any device or medium (e.g., storage device, non-transitory storage medium) that can store code and/or data for use by one or more processors 918. Medium 901 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 901 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 918 run various software components stored in medium 901 to perform various functions for system 900. In some embodiments, the software components include operating system 922, communication module (or set of instructions) 924, touch processing module (or set of instructions) 926, graphics module (or set of instructions) 928, one or more applications (or set of instructions) 930, and collaborative identifier module [or set of instructions] 938. In an embodiment, a collaborative application is associated with a collaborative identifier module 938. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments.

In some embodiments, medium 901 may store a subset of the modules and data structures identified above. Furthermore, medium 901 may store additional modules and data structures not described above.

Operating system 922 includes various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via RF circuitry 908 and includes various software components for handling data received from RF circuitry 908 and/or external port 936.

Graphics module 928 includes various known software components for rendering, animating and displaying graphical objects on a display surface. In embodiments in which touch I/O device 912 is a touch sensitive display (e.g., touch screen), graphics module 928 includes components for rendering, displaying, and animating objects on the touch sensitive display.

One or more applications 930 can include any applications installed on system 900, including without limitation, a collaborative application, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 926 includes various software components for performing various tasks associated with touch I/O device 912 including but not limited to receiving and processing touch input received from I/O device 912 via touch I/O device controller 932.

System 900 may further include collaborative identifier module 938 (e.g., collaborative mesh network module) for performing the method/functions as described herein in connection with FIGS. 2-4. In one embodiment, the collaborative identifier module 938 may at least function to use unique identifiers associated with systems in a mesh network to identify the systems. For example, the collaborative identifier module may identify the systems for player ordering in a multi-player gaming application. The collaborative identifier module can perform a hash function on a unique identifier associated with each system to generate a unique hash identifier for each system. Then, each system broadcasts packets that include the unique hash identifier for each system and also status information to other systems in the mesh network. The collaborative identifier module then can determine when the system has heard from all systems and when the other systems have also heard from all other systems. Then, the collaborative identifier module of each system can sort the unique hash identifiers to assign a relative reference value to each system in the mesh network and thus identify each system. In one embodiment, the collaborative identifier module of each system identifies other systems with these assigned relative reference values, which can be used for determining a player order in a multi-player gaming application or can be used for assigning each system to be a server or client in the mesh network.

Module 938 may also interact with collaborative application 930 to provide the methods and functionality described herein. Module 938 may be embodied as hardware, software, firmware, or any combination thereof. Although module 938 is shown to reside within medium 901, all or portions of module 938 may be embodied within other components within system 900 or may be wholly embodied as a separate component within system 900.

I/O subsystem 906 is coupled to touch I/O device 912 and one or more other I/O devices 914 for controlling or performing various functions. Touch I/O device 912 communicates with processing system 904 via touch I/O device controller 2032, which includes various components for processing user touch input (e.g., scanning hardware). One or more other input controllers 2034 receives/sends electrical signals from/to other I/O devices 914. Other I/O devices 914 may include physical buttons, dials, slider switches, sticks, keyboards, touch pads, additional display screens, or any combination thereof.

If embodied as a touch screen, touch I/O device 912 displays visual output to the user in a GUI. The visual output may include text, graphics, video, and any combination thereof. Some or all of the visual output may correspond to user-interface objects. Touch I/O device 912 forms a touch-sensitive surface that accepts touch input from the user. Touch I/O device 912 and touch screen controller 932 (along with any associated modules and/or sets of instructions in medium 901) detects and tracks touches or near touches (and any movement or release of the touch) on touch I/O device 912 and converts the detected touch input into interaction with graphical objects, such as one or more user-interface objects. In the case in which device 912 is embodied as a touch screen, the user can directly interact with graphical objects that are displayed on the touch screen. Alternatively, in the case in which device 912 is embodied as a touch device other than a touch screen (e.g., a touch pad), the user may indirectly interact with graphical objects that are displayed on a separate display screen embodied as I/O device 914.

Touch I/O device 912 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety.

Embodiments in which touch I/O device 912 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 912 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 900 also includes power system 944 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 916, one or more processors 918, and memory controller 920 may be implemented on a single chip, such as processing system 904. In some other embodiments, they may be implemented on separate chips.

In certain embodiments of the present disclosure, the system 900 can be used to implement at least some of the methods discussed in the present disclosure.

Some portions of the detailed descriptions are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present disclosure can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable non-transitory storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program (e.g., collaborative application) to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 10:
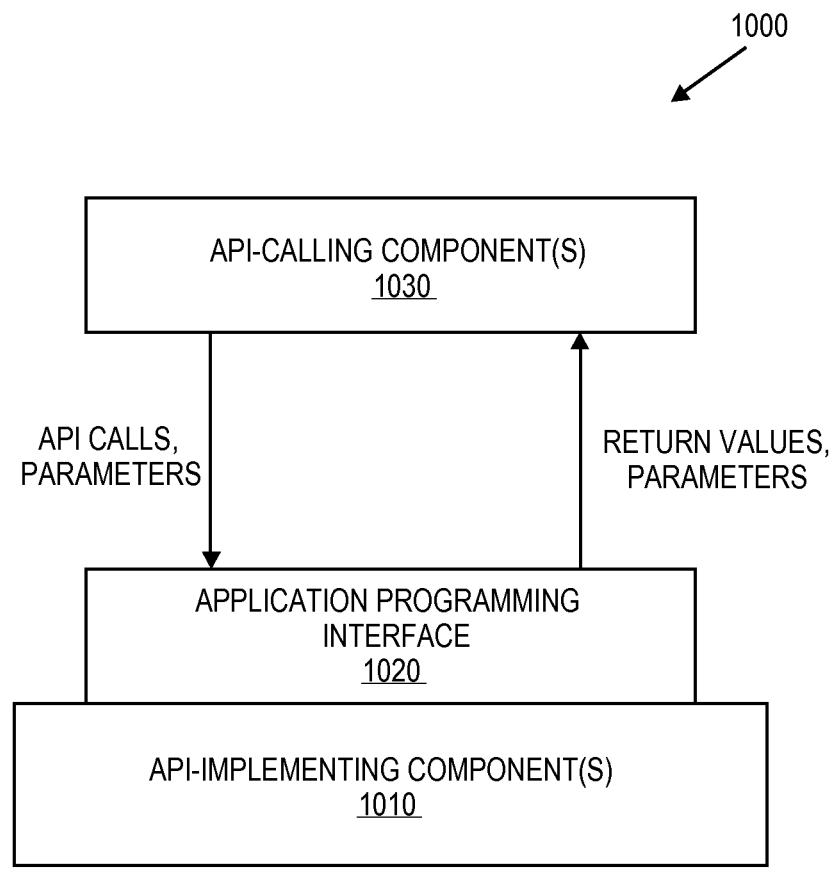
FIG. 10 is a block diagram illustrating an exemplary API architecture, which may be used in certain embodiments of the present disclosure.

FIG. 10 is a block diagram illustrating an exemplary API architecture, which may be used in certain embodiments of the present disclosure. As shown in FIG. 10, the API architecture 3200 includes the API-implementing component 1010 (e.g., an operating system, a library, a device driver, an API, an application program, software or other module) that implements the API 1020. The API 1020 specifies one or more functions, methods, classes, objects, protocols, data structures, formats and/or other features of the API-implementing component that may be used by the API-calling component 1030. The API 1020 can specify at least one calling convention that specifies how a function in the API-implementing component receives parameters from the API-calling component and how the function returns a result to the API-calling component. The API-calling component 1030 (e.g., an operating system, a library, a device driver, an API, an application program, software or other module) makes API calls through the API 1020 to access and use the features of the API-implementing component 1010 that are specified by the API 1020. The API-implementing component 1010 may return a value through the API 1020 to the API-calling component 1030 in response to an API call.

It will be appreciated that the API-implementing component 1010 may include additional functions, methods, classes, data structures, and/or other features that are not specified through the API 1020 and are not available to the API-calling component 1030. It should be understood that the API-calling component 1030 may be on the same system as the API-implementing component 1010 or may be located remotely and accesses the API-implementing component 1010 using the API 1020 over a network. While FIG. 10 illustrates a single API-calling component 1030 interacting with the API 1020, it should be understood that other API-calling components, which may be written in different languages (or the same language) than the API-calling component 1030, may use the API 1020.

The API-implementing component 1010, the API 1020, and the API-calling component 1030 may be stored in a machine-readable medium (e.g., computer-readable medium), which includes any mechanism for storing information in a form readable by a machine (e.g., a computer or other data processing system). For example, a machine-readable medium includes magnetic disks, optical disks, random access memory; read only memory, flash memory devices, etc.

Figure 11:
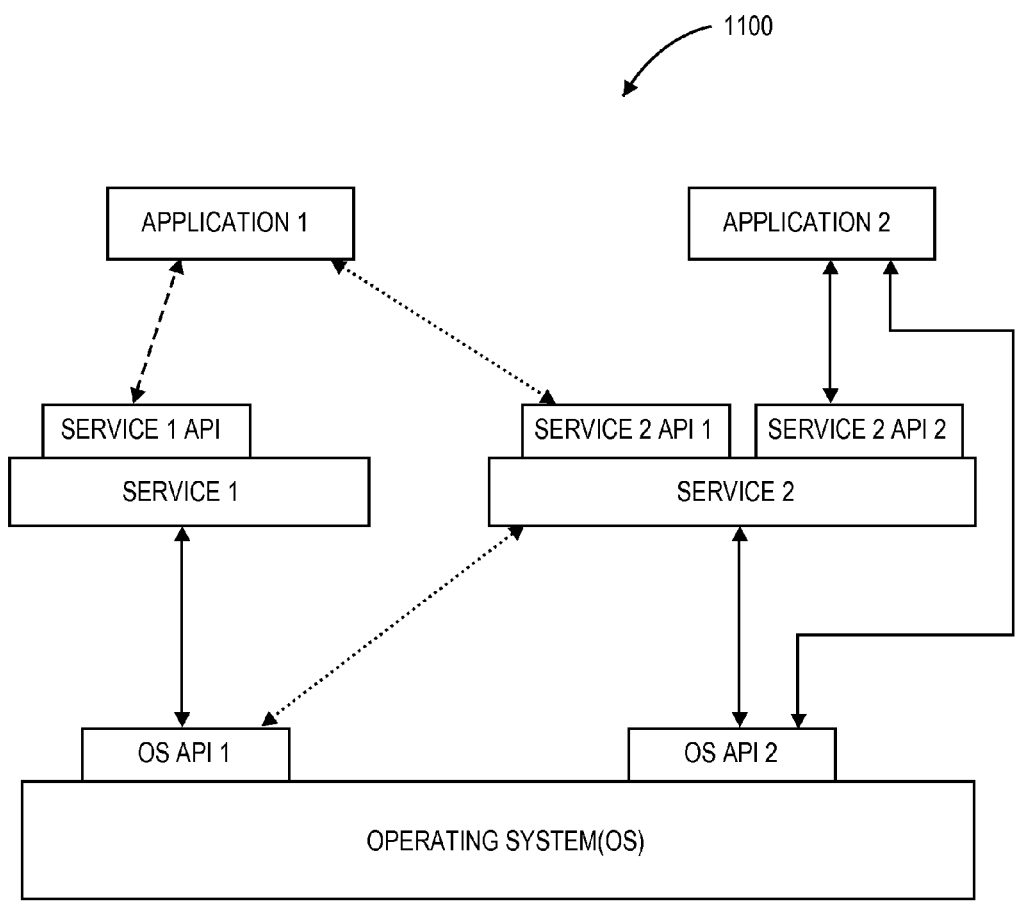
FIG. 11 illustrates a Software Stack for an exemplary embodiment in which applications can make calls to Services A or B using several Service APIs and to Operating System (OS) using several OS APIs.

In FIG. 11 ("Software Stack"), an exemplary embodiment, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

In the foregoing specification, the disclosure has been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method comprising:
    initiating a collaborative application on a system;
    obtaining a unique identifier from memory of the system;
    performing a hash function on the unique identifier for the system in a non-reversible manner to protect the unique identifier from being revealed to other systems in a network and to generate a unique hash identifier for the system;
    broadcasting packets that include the unique hash identifier from the system to at least one other system in the network that has initiated the collaborative application; and
    determining when the system has received packets that include unique hash identifiers and status information from all systems in the network that have initiated the collaborative application, wherein a packet of the system includes status information including an identification field having the unique hash identifier of the system, a first field that indicates a number of systems in the network that the system has received packets from, and a second field that indicates a number of systems in the network that a different system has received packets from upon initiation of the collaborative application; and
    sorting based on the packet of the system the unique hash identifiers of the systems in the network to assign a relative reference value for each system in the network.

2. The computer-implemented method of claim 1, further comprising:
    determining when each system has received the unique hash identifiers from all systems in the network and wherein the network is a mesh network.

3. A machine readable non-transitory storage medium containing executable computer program instructions which when executed by a computing system cause said system to perform a method, the method comprising:
    initiating a collaborative application on a system;
    obtaining a unique identifier from memory of the system;
    performing a hash function on the unique identifier for the system in a non-reversible manner to protect the unique identifier from being revealed to other systems in a network and to generate a unique hash identifier for the system;
    broadcasting packets that include the unique hash identifier from the system to at least one other system in the network that has initiated the collaborative application; and
    determining when the system has received packets that include unique hash identifiers and status information from all systems in the network that have initiated the collaborative application, wherein a packet of the system includes status information including an identification field having the unique hash identifier of the system, a first field that indicates a number of systems in the network that the system has received packets from, and a second field that indicates a number of systems in the network that a different system has received packets from upon initiation of the collaborative application; and
    sorting based on the packet of the system the unique hash identifiers of the systems in the network to assign a relative reference value for each system in the network.

4. The medium of claim 3, the method further comprises:
    determining when each system has received the unique hash identifiers from all systems in the network and wherein the network is a mesh network.

5. A computer-implemented method comprising:
    initiating a multi-player gaming application on a system;
    performing a hash function on a unique identifier for the system to protect the unique identifier from being revealed to other systems in a mesh network and to generate a unique hash identifier for the system;
    broadcasting packets that include the unique hash identifier from the system to at least one other system in the mesh network that has initiated the multi-player gaming application;
    determining when the system has received packets that include unique hash identifiers from all systems in the mesh network that have initiated the multi-player gaming application;
    determining when each system has received status information including the unique hash identifiers from all systems in the mesh network, wherein a packet of the system includes status information including an identification field having the unique hash identifier of the system, a first field that indicates a number of systems in the network that the system has received packets from, and a second field that indicates a number of systems in the network that a different system has received packets from upon initiation of the collaborative application; and
    sorting based on the packets received by the system the unique hash identifiers of the systems in the network to assign a relative reference value for each system in the network.

6. The computer-implemented method of claim 5, wherein the relative reference values in combination generate a player order for each player associated with a system in the mesh network.

7. The computer-implemented method of claim 5, wherein one of the relative reference values is used to assign a system to be a server in the mesh network.

8. The computer-implemented method of claim 7, wherein the other relative reference values are used to assign the other systems to be clients in the mesh network.

9. A machine readable non-transitory storage medium containing executable computer program instructions which when executed by a computing system cause said system to perform a method, the method comprising:
    initiating a multi-player gaming application on a system;
    performing a hash function on a unique identifier for the system to protect the unique identifier from being revealed to other systems in a mesh network and to generate a unique hash identifier for the system;
    broadcasting packets that include the unique hash identifier from the system to at least one other system in the mesh network that has initiated the multi-player gaming application;

determining when the system has received packets that include unique hash identifiers from all systems in the mesh network that have initiated the multi-player gaming application;

determining when each system has received status information including the unique hash identifiers from all systems in the mesh network, wherein a packet of the system includes status information including an identification field having the unique hash identifier of the system, a first field that indicates a number of systems in the network that the system has received packets from, and a second field that indicates a number of systems in the network that a different system has received packets from upon initiation of the collaborative application; and sorting based on the packets received by the system the unique hash identifiers of the systems in the network to assign a relative reference value for each system in the network.

10. The medium of claim 9, wherein the relative reference values in combination generate a player order for each player associated with a system in the mesh network.

11. The medium of claim 9, wherein one of the relative reference values is used to assign a system to be a server in the mesh network and the other relative reference values are used to assign the other systems to be clients in the mesh network.

12. A computer-implemented method comprising:

initiating a multi-player gaming application on a plurality of systems in a mesh network;

performing a hash function on a unique identifier for each system to generate a unique hash identifier for each system;

broadcasting packets that include the unique hash identifier and status information from each system in the mesh network;

determining when each system has received packets that include the unique hash identifiers and status information from all systems in the mesh network, wherein the status information for each system includes a field that indicates a numeric value for a number of systems that a different system has received the packets from in the mesh network; and sorting based on the packets received by each system the unique hash identifiers of the systems in the network to assign a relative reference value for each system in the network.

13. The computer-implemented method of claim 12, wherein the relative reference values in combination generate a player order for each player associated with a system in the mesh network.

14. The computer-implemented method of claim 12, wherein each packet is broadcast and received with an unreliable connectionless protocol.

15. A machine readable non-transitory storage medium containing executable computer program instructions which when executed by a computing system cause said system to perform a method, the method comprising:

initiating a multi-player gaming application on a plurality of systems in a mesh network;

performing a hash function on a unique identifier for each system to generate a unique hash identifier for each system;

broadcasting packets that include the unique hash identifier and status information from each system in the mesh network;

determining when each system has received packets that include the unique hash identifiers and status information from all systems in the mesh network, wherein the status information for each system includes a field that indicates a numeric value for a number of systems that a different system has received the packets from in the mesh network; and sorting based on the packets received by each system the unique hash identifiers of the systems in the network to assign a relative reference value for each system in the network.

16. The medium of claim 15, wherein the relative reference values in combination generate a player order for each player associated with a system in the mesh network.

17. The medium of claim 16, wherein each packet is broadcast and received with an unreliable connectionless protocol.

* * * * *